(12) United States Patent
Whaling et al.

(10) Patent No.: US 8,142,169 B2
(45) Date of Patent: Mar. 27, 2012

(54) VARIABLE GEOMETRY EJECTOR

(75) Inventors: Kenneth Neil Whaling, Simpsonville, SC (US); Dean Matthew Erickson, Simpsonville, SC (US); Hua Zhang, Greer, SC (US); David Wesley Ball, Easley, SC (US); Christina Renee Pompey, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 553 days.

(21) Appl. No.: 12/348,923

(22) Filed: Jan. 6, 2009

(65) Prior Publication Data

US 2010/0170265 A1 Jul. 8, 2010

(51) Int. Cl.
*F04F 5/48* (2006.01)
(52) U.S. Cl. ........... 417/189; 417/54; 417/185; 417/197
(58) Field of Classification Search ................ 417/182, 417/185, 187, 188, 189, 54, 198; 60/782, 60/785, 806; 239/451, 452, 455, 533.13, 239/546; 415/115
See application file for complete search history.

(56) References Cited

U.S. PATENT DOCUMENTS

| | | | | |
|---|---|---|---|---|
| 3,003,312 | A | * | 10/1961 | Jewell ...................... 239/265.35 |
| 3,441,045 | A | | 4/1969 | Malone |
| 3,891,353 | A | * | 6/1975 | Templeman .................. 417/183 |
| 4,595,344 | A | * | 6/1986 | Briley ........................... 417/185 |
| 4,631,004 | A | | 12/1986 | Mock |
| 6,412,270 | B1 | | 7/2002 | Mortzheim et al. |
| 6,523,346 | B1 | * | 2/2003 | Hoffmann et al. .............. 60/646 |
| 6,550,253 | B2 | | 4/2003 | Mortzheim et al. |
| 6,615,574 | B1 | | 9/2003 | Marks |
| 6,701,715 | B2 | | 3/2004 | Anderson et al. |
| 2003/0046938 | A1 | * | 3/2003 | Mortzheim et al. ............ 60/782 |
| 2005/0258275 | A1 | * | 11/2005 | Williams ...................... 239/518 |
| 2007/0125092 | A1 | | 6/2007 | Wolfe et al. |
| 2007/0256420 | A1 | | 11/2007 | Schott et al. |
| 2008/0202092 | A1 | | 8/2008 | Eluripati et al. |

* cited by examiner

*Primary Examiner* — Devon C Kramer
*Assistant Examiner* — Thomas Fink
(74) *Attorney, Agent, or Firm* — Sutherland Asbill & Brennan LLP

(57) ABSTRACT

An ejector for a turbine engine is described herein. The ejector may include a variable geometry motive nozzle and a variable geometry mixing tube positioned downstream of the variable geometry motive nozzle.

9 Claims, 3 Drawing Sheets

VARIABLE GEOMETRY EJECTOR

TECHNICAL FIELD

The present application relates generally to gas turbine engines and more particularly relates to the use of an ejector with a variable geometry nozzle and mixing tube so as to optimize the performance of the ejector and the gas turbine engine at any ambient temperature.

BACKGROUND OF THE INVENTION

In a gas turbine engine, a portion of the incoming airflow from the compressor may be diverted to cool various turbine components. The diverted air, however, may consume a large portion of the total airflow through the compressor, as much as about twenty percent. Improved management and control of these parasitic air flows therefore may increase the overall performance and efficiency of the gas turbine engine.

For example, air may be extracted from the compressor for the use as a cooling flow for various turbine components. The extracted air thus bypasses the combustion system. Ejectors are often useful for this purpose. Bleed air may be extracted from, for example, a thirteen stage of the compressor to cool a second stage nozzle of the turbine. Bleed air also may be extracted from another stage, for example, a ninth stage at a lower pressure and temperature than is extracted from the thirteenth stage for supplying cooling air to a third stage nozzle of the turbine. The extraction ports, however, often provide the cooling airflow at too high a pressure and/or temperature. The flow thus may be throttled to the desired pressure and/or temperature. This throttling, however, may result in a net loss of energy. By employing an ejector, a low pressure/temperature airflow may be mixed with a high pressure/temperature airflow to provide an airflow at an intermediate pressure and temperature so as to manage the pressure and temperature required to cool the turbine stages. The ejector thus makes use of the low pressure and temperature airflow that otherwise may be dissipated as waste energy.

An ejector generally does not have any moving parts. Rather, the ejector is sized to provide optimally the required airflow at ISO conditions (typically about 59 degrees Fahrenheit (about 15 degrees Celsius)). Daily temperature variations, however, will have an impact on the operational characteristics of the ejector. In other words, the ejector may behave differently on different days and at different times during each day. On hot days, the ejector may deliver more air than required and thus may overflow. Such an overflow may not impact the lifetime of the ejector, but the performance benefits may suffer. The optimum operating conditions for an ejector generally occur on hot days (above about 70 degrees Fahrenheit (about 21.1 degrees Celsius) and at part loads (e.g., below about a fifty percent load on the turbine). Conversely on cold days, a bypass line parallel to the ejector may be required to provide an additional cooling flow that the ejector cannot supply alone.

There is thus a desire for an ejector system that can accommodate daily variation in ambient conditions. Such a system preferably may increase the output and efficiency of the gas turbine engine as a whole.

SUMMARY OF THE INVENTION

The present application thus provides an ejector for a turbine engine. The ejector may include a variable geometry motive nozzle and a variable geometry mixing tube positioned downstream of the variable geometry motive nozzle.

The present application further provides a method of providing an air flow from a compressor to a turbine with an ejector having a variable geometry nozzle and a variable geometry mixing tube. The method may include the steps of expanding the variable geometry nozzle and contracting the variable geometry mixing tube given a cold ambient temperature. The method further may include the steps of contracting the variable geometry nozzle and expanding the variable geometry mixing tube given a hot ambient temperature.

The application further provides an ejector for a turbine engine. The ejector may include a variable geometry motive nozzle with a number of teeth and a variable geometry mixing tube having a flexible insert positioned within a mixing chamber.

These and other features of the present application will become apparent to one of ordinary skill in the art upon review of the following detailed description when taken in conjunction with the several drawings and the appended claims.

DETAILED DESCRIPTION

Figure 1:
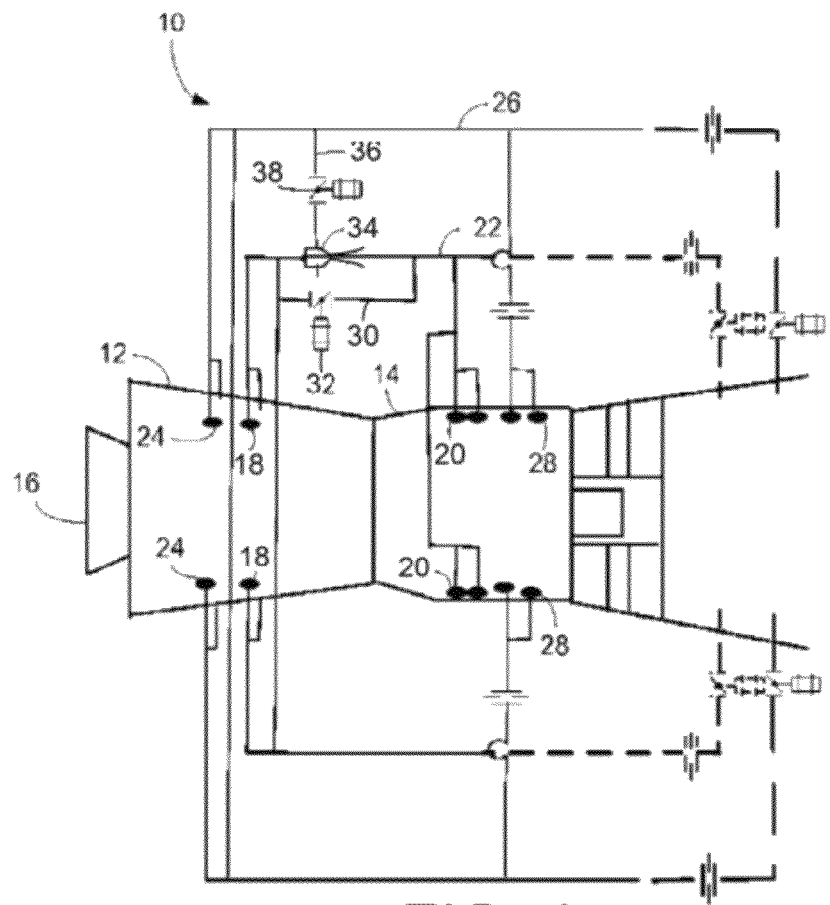
FIG. 1 is a schematic view of the compressor and turbine sections of a gas turbine engine with a known ejector.

Referring now to the drawings, in which like numerals refer to like elements throughout the several views, FIG. 1 shows a turbine engine system 10. The turbine engine system 10 includes a compressor 12 and a turbine 14. The compressor 12 includes an inlet 16 for receiving ambient air. The air is then compressed through a number of different compressor stages. Each stage compresses the air to higher pressures and temperatures. Most of the compressed air is the delivered to a combustor. The combustor combines the pressurized air with a flow of fuel to produce hot combustion gases. The hot combustion gases are then forwarded to the various stages of the turbine 14 to provide mechanical work. The turbine 14 thus drives the compressor 12 and an external load such as a generator. Bleed air typically also is removed from various stages of the compressors 12 for use as a cooling or a purge airflow in the turbine 14 and for other purposes.

By way of example, a high pressure air extraction may be taken from a thirteenth stage 18 of the compressor 12 and provided as a cooling airflow to a second stage nozzle 20 of the turbine 14 via a first flow path 22. As is shown, multiple flow paths may be used. Similarly, bleed air also may be extracted from an earlier stage, for example a ninth stage 24 of the compressor 12, and supplied via a second flow path 26 as cooling air to a third stage nozzle 28. A bypass flow path 30 also may be in communication with the first flow path 22. The bypass flow path 30 may include a throttling valve 32. As described above, the bypass flow path 30 may provide additional airflow on cold days.

An ejector 34 may be positioned in the flow path 22. As described above, the ejector 34 enables mixing of the bleed air from the flow paths 22, 26 so as to adjust the extraction flows to optimize the efficiency of the overall turbine engine system 10. The ejector 34 may be in communication with the second air flow path 26 via a crossover flow path 36 positioned between the flow paths 22, 26. The crossover flow path 36 may include an isolation valve 38. The isolation valve 38 may isolate the ejector 34 when ambient conditions are not favorable. Any number of crossover flow paths 36 may be used herein. Other configurations may be used herein.

Figure 2:
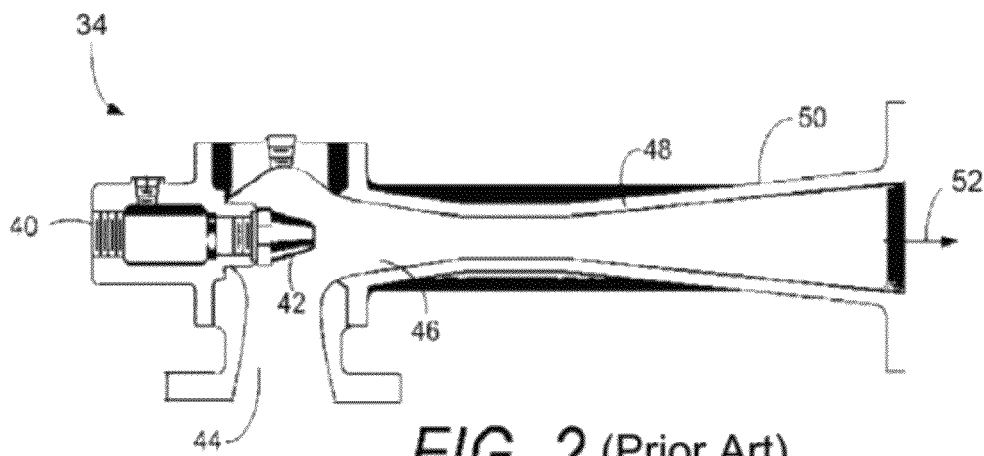
FIG. 2 is a side cross-sectional view of a known ejector.

FIG. 2 shows a known ejector 34. The ejector 34 is a mechanical device with no moving parts. Because the ejector 34 has no moving parts, it is designed to operate at a specific design point based on ISO day conditions. The ejector 34 mixes two fluid streams based on a momentum transfer. The ejector 34 has a motive air inlet 40 for the high pressure motive fluid received via the first flow path 22, a primary nozzle 42 to lower the static pressure for the motive flow to a pressure below the total pressure of the suction pressure, an suction air inlet 44 for the low pressure or suction fluid received via the crossover flow path 36, a secondary nozzle 46 for accelerating the secondary flow to drop its static pressure, a mixing tube 48 for mixing the two flows, and a diffuser 50 for decelerating the mixed flow and regaining static pressure. Known ejector systems are shown in commonly owned U.S. Pat. Nos. 6,550,253 and 6,615,574.

By locating the ejector 34 in the flow path 22, the high-pressure extraction flow from the thirteenth stage 18 of the compressor 12 serves as the motive flow at the motive inlet 44 of the ejector 34. The lower pressure, lower temperature flow from the second flow path 26 flows to the ejector 34 via the crossover flow path 36 and serves as the suction flow via the suction inlet 44. Thus, the two flows are mixed together and flow through the diffuser 50 of the ejector 34. The two flows form a third flow 52 and exit at a pressure and a temperature intermediate of the pressure and temperature of the respective motive and suction flows. Other configurations and other flow paths may be used herein.

Figure 3:
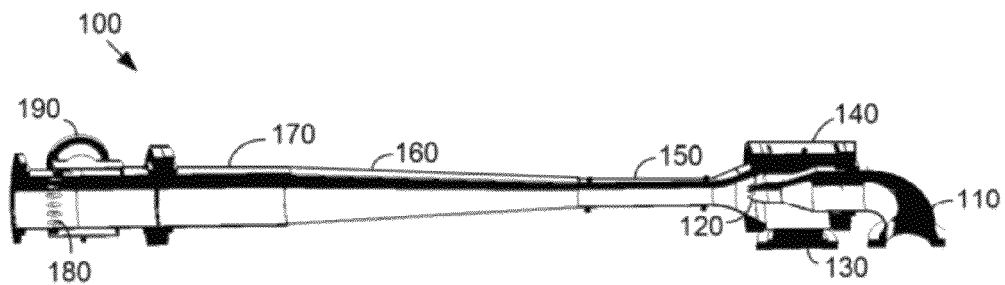
FIG. 3 is a side cross-sectional view of a variable geometry ejector as is described herein.

FIG. 3 is a side cross-sectional view of a variable geometry ejector 100 as is described herein. The variable geometry ejector 100 may include a motive air inlet 110. The motive air inlet 110 may be in communication with the first flow path 22 associated with the thirteen stage 18 of the compressor 12. The motive air inlet 110 leads to a motive nozzle 120. The motive nozzle 120 will be described in more detail below. The variable geometry ejector 100 also includes a suction air inlet 130. The suction air inlet 130 may be in communication with the second flow path 26 associated with the ninth stage 24 of the compressor 12 via the crossover line 36. The suction air inlet 130 leads to a suction chamber 140.

The motive nozzle 120 and the suction chamber 140 are in communication with a mixing tube 150. The mixing tube 150 will be described in more detail below. The mixing tube 150 is, in turn, in communication with a diffuser 160. A discharge end 170 likewise may be in communication with the diffuser 160. The discharge end 170 may include a number of mixing holes 180. The mixing holes 180 may have any size or shape. Any number of mixing holes 180 may be used herein. The discharge end 170 may be in communication with the second stage nozzle 20 via the third flow path 52. The discharge end 170 also may include a bypass inlet 190. The bypass inlet 190 may be in communication with the bypass flow path 30. Other configurations and other flow paths may be used herein.

Figure 4:
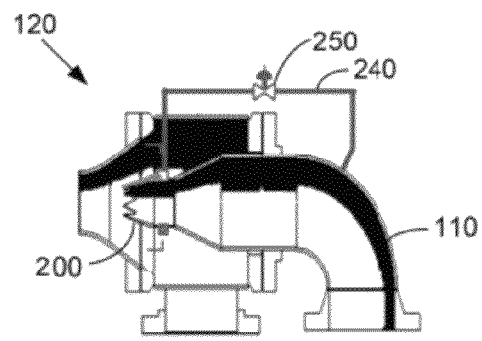
FIG. 4 is a side cross-sectional view of a chevron nozzle for use with the variable geometry ejector of FIG. 3.
Figure 6:
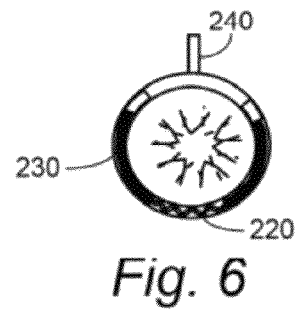
FIG. 6 is a side cross-sectional view of the chevron nozzle.
Figure 5:
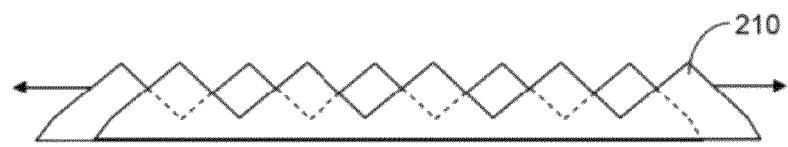
FIG. 5 is a schematic view of the chevron nozzle.

FIGS. 4 through 6 show an example of the motive nozzle 120 as is described herein. In this example, the motive nozzle 120 may be in the form of a chevron nozzle 200. The chevron nozzle 200 may have a number of chevron nozzle teeth 210. Rotating the nozzle teeth 210 may increase or decrease the size of the flow path through the chevron nozzle 200. The chevron nozzle teeth 210 may have any size or configuration. Any number of chevron nozzle teeth 210 may be used herein. The chevron nozzle teeth 210 may be connected via a spring 220. The teeth 210 and the spring 220 may be positioned within a pressure regulated chamber 230. The chamber 230 may be in communication with a chevron air line 240 connected to the motive air inlet 110. The chevron air line 240 may have a nozzle pressure valve 250 positioned thereon. The chevron nozzle 200 thus may increase or decrease the size of the flow path therethrough based upon the pressure on the nozzle teeth 210 and the spring 220 as determined by the nozzle pressure valve 250 on the chevron air line 240. Other types of nozzle configurations may be used herein.

Figure 7:
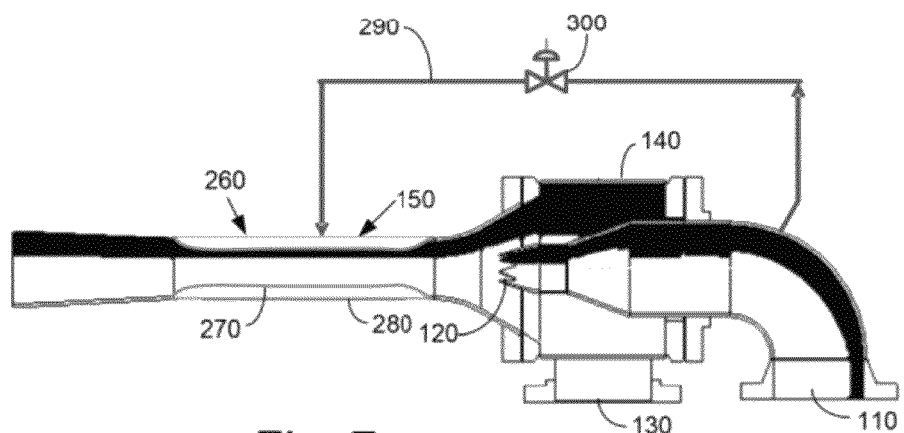
FIG. 7 is a side cross-sectional view of the mixing tube as may be used with the variable geometry ejector of FIG. 3.

FIG. 7 shows a side cross-sectional view of the mixing tube 150. In this example, the mixing tube 150 may be a flexible mixing tube 260. The flexible mixing tube 260 may include a flexible insert 270 positioned within a mixing chamber 280. The flexible insert 270 may be made of a somewhat flexible material. The mixing chamber 280 may be in communication with a mixing tube air line 290 in communication with the motive air inlet 110. A mixing tube pressure valve 300 may be positioned on the mixing tube air line 290. Increasing the air pressure within the mixing chamber 280 via the mixing tube pressure valve 300 causes the internal diameter of the flexible insert 270 to contract in size such that the interior diameter and the flow path therethrough may be varied as desired. Any diameter may be used herein. Other types of flow restrictions also may be used herein.

In use, it has been determined that when the ambient temperature is cold, the use of a larger chevron nozzle 200 and a smaller flexible mixing tube 260 may be preferred because the larger sized nozzle 200 has higher suction, i.e., the higher potential for suction flows. In contrast, when the ambient temperature is hot, the use of a smaller chevron nozzle 200 and a larger flexible mixing tube 260 may be preferred. The geometry of the chevron nozzle 200 thus may be altered via the nozzle pressure valve 250 while the geometry of the mixing tube 260 may be altered via the mixing tube pressure valve 300. The ejector 100 may use other sizes, configurations, and combinations herein.

Figure 8:
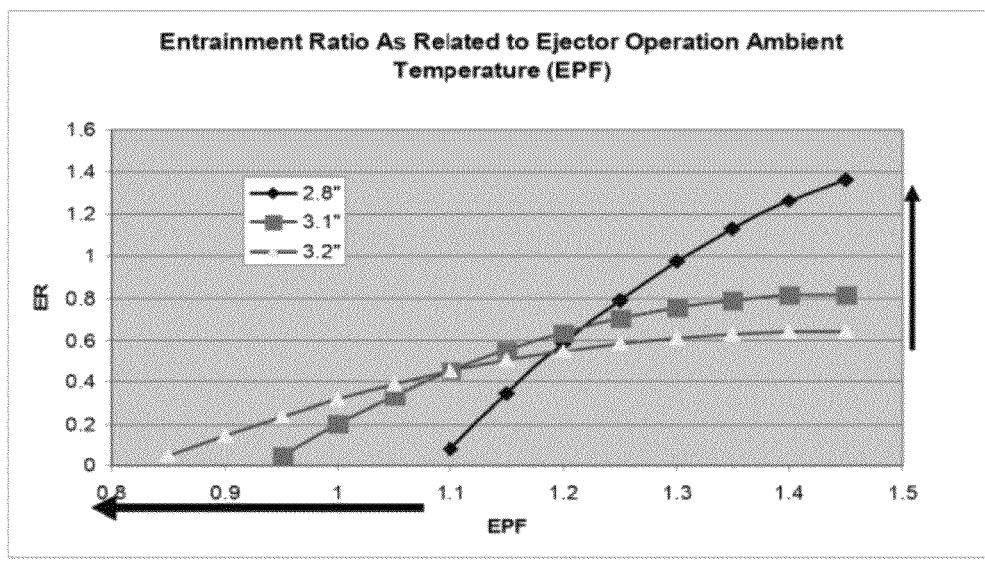
FIG. 8 is a chart that shows the entrapment ratio as related to ejector operation ambient temperature.

FIG. 8 shows the entrainment ratio as related to the ejector operation ambient temperature. As is shown, smaller ratios of the nozzle 200 and the mixing tube 260 give higher entrainment on hot days with lower total flows to prevent overcooling of the second stage nozzle 20 while a larger ratio gives more robust entrainment on cold days with higher total flows. In both modes, the entrainment ratio may be optimal and the flow to the second stage nozzle 20 may be met without the use of a bypass line. The variable geometry ejector 100 thus eliminates the need for a bypass mixer. By ensuring ambient performance over any ambient temperature, an efficiency gain for the variable geometry ejector 100 is expected to increase by about twenty to about thirty percent or more.

It should be apparent that the foregoing relates only to certain embodiments of the present application and that numerous changes and modifications may be made herein by one of ordinary skill in the art without departing from the general spirit and scope of the invention as defined by the following claims and the equivalents thereof.

We claim:

1. An ejector for a turbine engine, comprising:
 a variable geometry motive nozzle having a plurality of spring loaded teeth;

the plurality of spring loaded teeth being positioned within a pressure chamber;

the pressure chamber being in communication with a diverted flow from a motive air inlet having a nozzle pressure valve so as to vary the position of the plurality of spring loaded teeth to increase or decreases a flow path diameter through the variable geometry motive nozzle; and a variable geometry mixing tube positioned downstream of the variable geometry motive nozzle.

2. The ejector of claim 1, wherein the variable geometry mixing tube comprises a flexible insert positioned within a mixing chamber.

3. The ejector of claim 2, wherein the mixing chamber is in communication with a mixing chamber pressure valve so as to vary the diameter of the flexible insert.

4. The ejector of claim 1, wherein the variable geometry motive nozzle is in communication with a motive air inlet.

5. The ejector of claim 4, further comprising a suction inlet in communication with a suction chamber.

6. A method of providing an air flow from a compressor to a turbine with an ejector having a variable geometry nozzle and a variable geometry mixing tube, comprising:

expanding the variable geometry nozzle with a first diverted flow from a motive air inlet using a first nozzle pressure valve; and contracting the variable geometry mixing tube given a cold ambient temperature with a second diverted flow from the motive air inlet using a second nozzle pressure valve; and contracting the variable geometry nozzle with the first diverted flow from the motive air inlet using the first nozzle pressure valve;

expanding the variable geometry mixing tube given a hot ambient temperature with the second diverted flow from the motive air inlet using the second nozzle pressure valve; and wherein the steps of expanding or contracting the variable geometry nozzle comprise maneuvering a plurality of spring loaded teeth.

7. The method of claim 6, wherein the steps of expanding or contracting the variable geometry nozzle comprise altering the pressure within a pressure chamber.

8. The method of claim 6, wherein the steps of expanding or contracting the variable geometry mixing tube comprises varying the diameter of a flexible insert within a mixing chamber.

9. The method of claim 6, wherein the steps of expanding or contracting the variable geometry mixing tube comprises altering the pressure within a mixing chamber.

* * * * *